US012775868B2

(12) United States Patent
Cruz Benito et al.

(10) Patent No.: US 12,775,868 B2
(45) Date of Patent: Oct. 27, 2026

(54) ATTENTION-BASED NEURAL NETWORKS FOR QUANTUM COMPUTING SIMULATIONS

(71) Applicant: International Business Machines Corporation, Armonk, NY (US)

(72) Inventors: Juan Cruz Benito, Salamanca (ES); Ivan Duran Martinez, Elmsford, NY (US); Francisco Jose Martin Fernandez, Ridgefield, CT (US); Ismael Faro Sertage, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 771 days.

(21) Appl. No.: 18/198,532

(22) Filed: May 17, 2023

(65) Prior Publication Data

US 2024/0311679 A1 Sep. 19, 2024

(30) Foreign Application Priority Data

Mar. 17, 2023 (EP) .................................... 23382250

(51) Int. Cl.
*G06N 10/80* (2022.01)
*G06N 10/20* (2022.01)

(52) U.S. Cl.
CPC ............. *G06N 10/80* (2022.01); *G06N 10/20* (2022.01)

(58) Field of Classification Search
CPC ........ G06N 10/80; G06N 10/20; G06N 3/044; G06N 3/045; G06N 3/063; G06N 3/08; G06N 3/084; G06N 10/00
See application file for complete search history.

(56) References Cited

U.S. PATENT DOCUMENTS

| | | | |
|---|---|---|---|
| 7,383,235 | B1 | 6/2008 | Ulyanov |
| 2020/0285947 | A1 | 9/2020 | Gunnels |
| 2022/0269972 | A1 | 8/2022 | Bandyopadhyay |

FOREIGN PATENT DOCUMENTS

| | | | |
|---|---|---|---|
| CA | 2618651 | A1 | 8/2009 |
| CA | 3121561 | A1 | 6/2020 |
| CN | 111553481 | A | 8/2020 |
| CN | 114444664 | A | 5/2022 |
| CN | 114792378 | A | 7/2022 |
| KR | 102186852 | B | 12/2020 |

(Continued)

OTHER PUBLICATIONS

Wang H, Liu P, Cheng J, Liang Z, Gu J, Li Z, Ding Y, Jiang W, Shi Y, Qian X, Pan DZ. Quest: Graph transformer for quantum circuit reliability estimation. arXiv preprint arXiv:2210.16724. Oct. 30, 2022. (Year: 2022).*

(Continued)

*Primary Examiner* — Kc Chen

(74) *Attorney, Agent, or Firm* — Amin, Turocy & Watson, LLP

(57) ABSTRACT

Quantum code-related entities are obtained and one or more of a set of one or more trained neural network models are selected for inferencing based on the quantum code-related entities. The inferencing is performed using the submitted quantum code-related entities and the selected one or more trained neural network models, and a result of the inferencing operation is returned.

20 Claims, 9 Drawing Sheets

(56) References Cited

FOREIGN PATENT DOCUMENTS

| | | | |
|---|---|---|---|
| WO | 2020113339 | W | 6/2020 |
| WO | 2021257128 | W | 12/2021 |

OTHER PUBLICATIONS

Carrasquilla J, Luo D, Pérez F, Milsted A, Clark BK, Volkovs M, Aolita L. Probabilistic simulation of quantum circuits using a deep-learning architecture. Physical Review A. Sep. 2021;104(3):032610. (Year: 2021).*

Cantori S, Vitali D, Pilati S. Supervised learning of random quantum circuits via scalable neural networks. arXiv preprint arXiv: 2206.10348. Jun. 21, 2022. (Year: 2022).*

Cross A, Javadi-Abhari A, Alexander T, de Beaudrap N, Bishop LS, Heidel S, Ryan CA, Sivarajah P, Smolin J, Gambetta JM, Johnson BR. OpenQASM 3: A broader and deeper quantum assembly language. ACM Transactions on Quantum Computing. Sep. 2022;3(3):Article 12; arXiv preprint arXiv:2104.14722. Mar. 18, 2022. (Year: 2022).*

Firat O, Cho K, Bengio Y. Multi-Way, Multilingual Neural Machine Translation with a Shared Attention Mechanism. Proceedings of NAACL-HLT 2016. Jun. 2016:866-875; arXiv preprint arXiv:1601.01073. (Year: 2016).*

Baireuther et al. "Machine-Learning-Assisted Correction of Correlated Qubit Errors in a Topological Code," Quantum, arXiv:1705.07855v3 [quant-ph], Jan. 17, 2018, 10 pages.

Behrman et al. "A Quantum Neural Network Computes Entanglement," arXiv preprint, quant-ph/0202131, Feb. 22, 2002, 8 pages.

Bharti et al. "Machine Learning Meets Quantum Foundations: A Brief Survey," AVS Quantum Science, Jun. 12, 2020, 17 pages, vol. 2, No. 3.

Biamonte et al. "Quantum Machine Learning," Nature, Sep. 14, 2017, pp. 195-202, vol. 549.

Dunjko et al. "Machine Learning & Artificial Intelligence in the Quantum Domain: A Review of Recent Progress," Reports on Progress in Physics, Jun. 19, 2018, 68 pages, vol. 81, No. 7, Article 074001.

Emani et al. "Quantum Computing at the Frontiers of Biological Sciences," Nature Methods, Jan. 4, 2021, pp. 1-9.

Gao et al. "Efficient Representation of Quantum Many-Body States with Deep Neural Networks," Nature Communications, Sep. 22, 2017, pp. 1-6, vol. 8, No. 1.

Gomes et al. "Classical Quantum Optimization with Neural Network Quantum States," arXiv preprint, arXiv:1910.10675v1 [cond-mat.dis-nn], Oct. 23, 2019, 6 pages.

Hartmann et al. "Neural-Network Approach to Dissipative Quantum Many-Body Dynamics," Physical Review Letters, Feb. 13, 2019, 9 pages, vol. 122, No. 25, Article 250502.

Jia et al. "Quantum Neural Network States: A Brief Review of Methods and Applications," Advanced Quantum Technologies, Mar. 25, 2019, 16 pages, vol. 2, Nos. 7-8, Article 1800077.

Jónsson et al. "Neural-Network States for the Classical Simulation of Quantum Computing," arXiv:1808.05232v1 [quant-ph], Aug. 15, 2018, 8 pages.

Lennon et al. "Efficiently Measuring a Quantum Device Using Machine Learning," npj Quantum Information, Sep. 26, 2019, 8 pages, vol. 5, No. 1, Article 1.

Martonosi et al. "Next Steps in Quantum Computing: Computer Science's Role," arXiv preprint, arXiv:1903.10541, Mar. 25, 2019, 25 pages.

Matsui et al. "A Network Model Based on Qubitlike Neuron Corresponding to Quantum Circuit," Electronics and Communications in Japan (Part III: Fundamental Electronic Science), Apr. 20, 2000, pp. 67-73, vol. 83, No. 10.

Moon et al. "Machine Learning Enables Completely Automatic Tuning of a Quantum Device Faster Than Human Experts," Nature Communications, Aug. 19, 2020, vol. 11, No. 1, pp. 1-10.

Nagy et al. "Variational Quantum Monte Carlo Method with a Neural-Network Ansatz for Open Quantum Systems," Physical Review Letters, Jun. 28, 2019, 6 pages, vol. 122, No. 25, Article 250501.

Nautrup et al. "Optimizing Quantum Error Correction Codes with Reinforcement Learning," Quantum, Dec. 13, 2019, 28 pages, vol. 3, Article 215.

Nguyen et al. "Deep Reinforcement Learning for Efficient Measurement of Quantum Devices," npj Quantum Information, Jun. 18, 2021, 9 pages.

Pan et al. "Simulating the Sycamore Quantum Supremacy Circuits," arXiv:2103.03074v1 [quant-ph], Mar. 4, 2021, 9 pages.

Preskill et al. "Quantum Computing in the NISQ Era and Beyond," Quantum, Jul. 31, 2018, 20 pages.

Qiu et al. "Detecting Entanglement with Deep Quantum Neural Networks," IEEE Access, Jul. 2019, 11 pages, vol. 7.

Schuld et al. "An Introduction to Quantum Machine Learning," Contemporary Physics, 2015, pp. 172-185, vol. 56, No. 2.

Van Esbroeck et al. "Quantum Device Fine-Tuning Using Unsupervised Embedding Learning," New Journal of Physics, arXiv:2001.04409v1 [cond-mat.mes-hall], Jan. 13, 2020, 11 pages, vol. 22, No. 9, 2020, Article 095003.

Vicentini et al. "Variational Neural-Network Ansatz for Steady States in Open Quantum Systems," Physical Review Letters, Jun. 28, 2019, 6 pages, vol. 122, No. 25, Article 250503.

Zeng et al. "First Quantum Computers Need Smart Software," Nature, Sep. 14, 2017, pp. 149-151, vol. 549, No. 7671.

Canadian Intellectual Property Office, CA2618651A1. Aug. 25, 2009 pp. 16.

IBM Quantum. Downloaded from https://quantum-computing.ibm.com/ on Jan. 29, 2023, pp. 2.

Peter Mell and Timothy Grance, The NIST Definition of Cloud Computing, NIST Special Publication 800-145, cover, pp. i-iii, 1-3, Sep. 2011.

* cited by examiner

QASM (1 qregs)

```
OPENQASM 2.0;
include "qelib1.inc";

qreg q[1];
creg c[1];

h q[0];
h q[0];
measure q[0] -> c[0];
```

Result from simulator

```
"counts": {
 "0": 1024
}
```

Result from AI model

```
"counts": {
 "0": 1024
}
```

*FIG. 3A*

QASM (3 qregs)

```
OPENQASM 2.0;
include "qelib1.inc";
qreg q[3];
creg c[3];
s q[1];
x q[2];
u2(3.2586451,3.9229148) q[0];
measure q[0] -> c[0];
measure q[1] -> c[1];
measure q[2] -> c[2];
```

Result from simulator

```
"counts": {
    "100": 514,
    "101": 510
}
```

Result from AI model

```
"counts": {
    "100": 513,
    "101": 511
}
```

*FIG. 3B*

QASM (5 qregs)

```
OPENQASM 2.0;
include "qelib1.inc";
qreg q[5];
creg c[5];
cy q[2],q[1];
z q[3];
z q[0];
u3(0.65865464,6.1745777,1.3377423) q[4];
ccx q[0],q[2],q[3];
sdg q[1];
u1(0.97200948) q[4];
cu1(3.3161864) q[4],q[1];
cswap q[0],q[3],q[2];
measure q[0] -> c[0];
measure q[1] -> c[1];
measure q[2] -> c[2];
measure q[3] -> c[3];
measure q[4] -> c[4];\n
```

Result from simulator

"counts": {
"10000": 113,
"00000": 911
}

Result from AI model

"counts": {
"10000": 109,
"00000": 915
}

*FIG. 3C*

QASM (6 qregs, fails by 1 zero in state)

```
OPENQASM 2.0;
include "qelib1.inc";
qreg q[6];
creg c[6];
cy q[2],q[1];
z q[3];
z q[0];
u3(0.65865464,6.1745777,1.3377423) q[4];
ccx q[0],q[2],q[3];
sdg q[1];
u1(0.97200948) q[4];
cu1(3.3161864) q[4],q[1];
cswap q[0],q[3],q[2];
measure q[0] -> c[0];
measure q[1] -> c[1];
measure q[2] -> c[2];
measure q[3] -> c[3];
measure q[4] -> c[4];\n
```

Result from simulator

```
"counts": {
 "000100": 1024
}
```

Result from AI model

```
"counts": {
  "00100": 1024
}
```

*FIG. 3D*

Random source code (10 qregs, fails)

```
OPENQASM 2.0;
include "qelib1.inc";
qreg q[10];
creg c[10];
y q[8];
cx q[7],q[0];
cx q[2],q[6];
cz q[3],q[4];
rx(1.3417814) q[1];
cu3(1.6435474,2.9627617,4.2826596) q[5],q[9];
cswap q[0],q[1],q[5];
crz(1.8885276) q[6],q[2];
ccx q[4],q[3],q[7];
h q[8];
u2(5.2814953,5.2526761) q[9];
measure q[0] -> c[0];
measure q[1] -> c[1];
measure q[2] -> c[2];
measure q[3] -> c[3];
measure q[4] -> c[4];
measure q[5] -> c[5];
measure q[6] -> c[6];
measure q[7] -> c[7];
measure q[8] -> c[8];
measure q[9] -> c[9];
```

⇨

Result from simulator

```
"counts": {
 "1100000000": 152,
 "1100000010": 86,
 "0000000010": 94,
 "0100000000": 169,
 "0100000010": 98,
 "1000000000": 151,
 "1000000010": 101,
 "0000000000": 173}
}
```

Result from AI model

```
"counts": {
 "00001": 205,
 "00101": 301,
 "01001": 207,
 "01101": 313
}
```

*FIG. 3E*

Random source code (2 qregs, QASM error)

```
OPENQASM 2.0;
include "qelib1.inc";
qreg q[2];
creg c[2];
cry(3.141592653589793) q[0],q[0];
sx q[0];
ry(0.0) q[1];
rz(3.141592653589793) q[1];
cy q[0],q[1];
measure q[0] -> c[0];
measure q[1] -> c[1];
```

⇨

Result from simulator

"QasmError"

Result from AI model

"QasmError"

FIG. 3F

ATTENTION-BASED NEURAL NETWORKS FOR QUANTUM COMPUTING SIMULATIONS

CROSS-REFERENCE TO RELATED APPLICATIONS

This application claims foreign priority to European Patent Application EP 23382250 filed 17 Mar. 2023, the complete disclosure of which is expressly incorporated herein, in its entirety, for all purposes.

BACKGROUND

The present invention relates generally to the electrical, electronic and computer arts and, more particularly, to machine learning, neural networks, and quantum computing.

Conventional general context-aware quantum simulators are programs that simulate quantum computations. These simulators can simulate the quantum calculations made by a real quantum device (backend). Although the simulators can attempt to include noise or errors mapped from real devices, they usually perform as ideal devices. Conventional simulators are mainly constrained by the fact that they are not quantum (they work using a base seed for their calculations) and need a large amount of hardware resources to execute the operations above a certain number, N, of qubits.

BRIEF SUMMARY

Principles of the invention provide techniques for attention-based neural networks for quantum computing solutions. In one aspect, an exemplary method includes the operations of obtaining quantum code-related entities; selecting, using a hardware computing device, one or more of a set of one or more trained neural network models for inferencing based on the quantum code-related entities; performing, using the hardware computing device, the inferencing using the submitted quantum code-related entities and the selected one or more trained neural network models; and returning a result of the inferencing operation.

In one aspect, an apparatus comprises a memory and at least one processor, coupled to the memory, and operative to perform operations comprising obtaining quantum code-related entities; selecting, using a hardware computing device, one or more of a set of one or more trained neural network models for inferencing based on the quantum code-related entities; performing, using the hardware computing device, the inferencing using the submitted quantum code-related entities and the selected one or more trained neural network models; and returning a result of the inferencing operation.

In one aspect, a non-transitory computer readable medium comprises computer executable instructions which when executed by a computer cause the computer to perform the method of obtaining quantum code-related entities; selecting, using a hardware computing device, one or more of a set of one or more trained neural network models for inferencing based on the quantum code-related entities; performing, using the hardware computing device, the inferencing using the submitted quantum code-related entities and the selected one or more trained neural network models; and returning a result of the inferencing operation.

As used herein, "facilitating" an action includes performing the action, making the action easier, helping to carry the action out, or causing the action to be performed. Thus, by way of example and not limitation, instructions executing on a processor might facilitate an action carried out instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

- a quantum simulator implemented with a neural network;
- generates estimated results of a quantum program using inferencing;
- provides techniques for testing, evaluating and debugging quantum programs without requiring the resources of a quantum device or conventional quantum simulator;
- outperforms conventional simulators in terms of computation time, computing behavior, and number N of qubits employed in the simulation;
- provides more consistent simulations of the behavior of real quantum backends than classical simulators;
- improves the technological process of computerized simulation of quantum computing by using a neural network to reduce CPU time and/or memory resources as compared to current techniques and/or by using a neural network to enable handling a greater number of qubits as compared to current techniques; and
- improves exploration work on quantum computing by testing quantum algorithms beyond the current limits of conventional quantum simulators.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIGS. 3A-3F are examples of quantum programs and the results generated by a given quantum calculator and the system using the quantum program, in accordance with an example embodiment.

Figure 1:
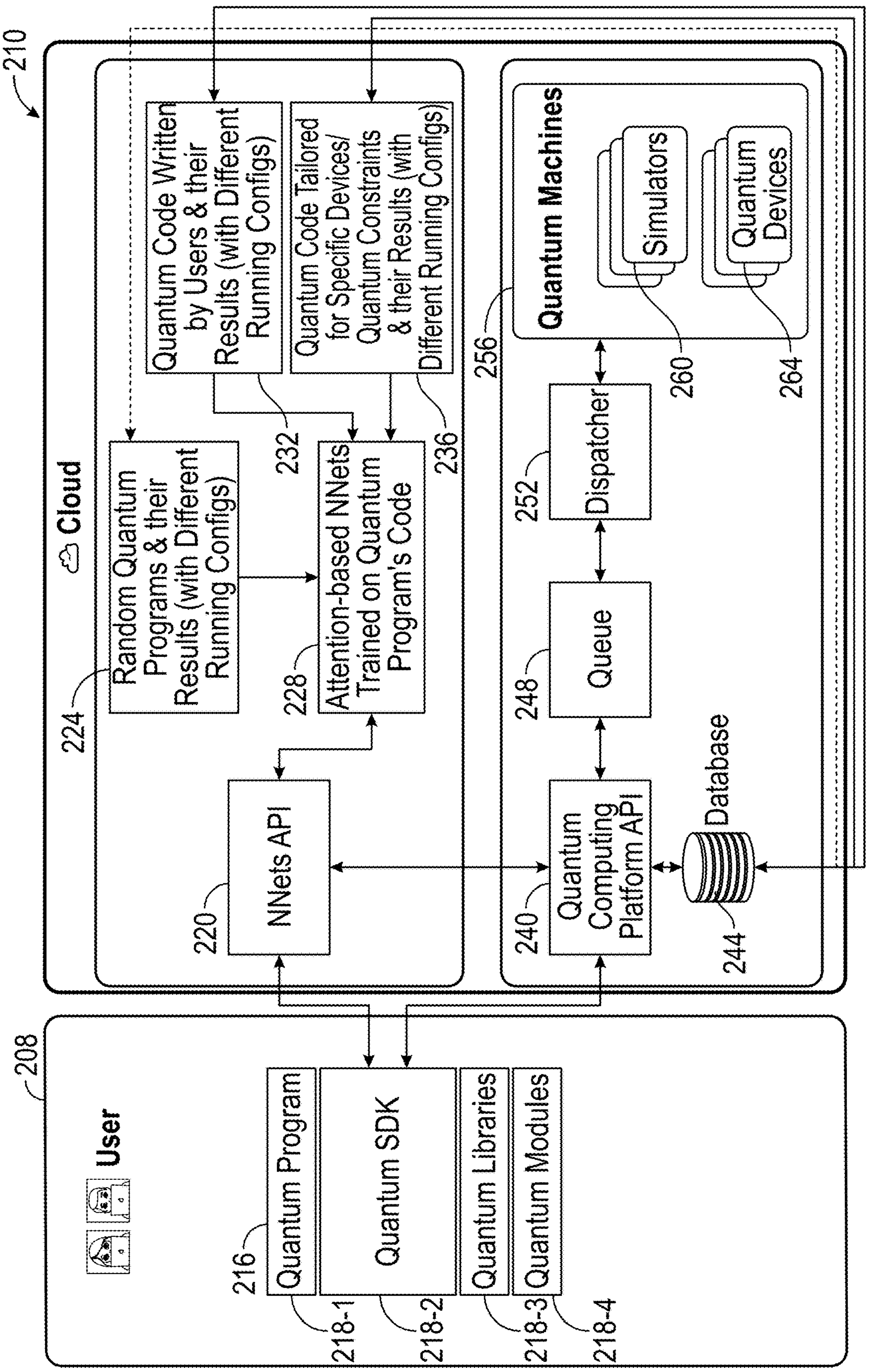
FIG. 1 is a high-level block diagram of an example neural-based quantum simulator system for determining the results of a quantum program, in accordance with an example embodiment.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

As used herein, a quantum program is a piece of source code written in any language, specification, markup language, and the like, expressing instructions to run in a unit with specific hardware capabilities and quantum-like behavior. A hardware unit can be a quantum device, a quantum simulator, a part of the hardware or software composing or related to a quantum device, or any other system that computes information using a specific hardware composition. Attention-based neural networks are a type of neural network that mimics cognitive attention. The effect enhances the important parts of the input data and fades out the rest of the input data.

Generally, attention-based neural networks for performing quantum-computing simulations are disclosed. One or more embodiments of attention-based neural networks scale their knowledge to outperform conventional quantum simulators in terms of execution time, quantum backend behavior, number N of supported qubits, and the like.

Conventional quantum simulators cannot scale above certain specific constraints, such as number N of qubits, depth of circuits, and the like. Also, unless the behavior is explicitly coded, they usually do not mimic realistic behaviors of quantum computers (also referred to a quantum devices, backends, or quantum backends herein). In one example embodiment, neural networks are used to understand the input and corresponding output from quantum systems, and to reproduce quantum computing simulations. They are configured to scale the number N of qubits on which they are trained. One or more embodiments of neural-based quantum simulators can outperform conventional quantum simulators in terms of computing time, computing behavior, number N of qubits used for the calculations, and the like.

Features

Generally, methods and systems for performing quantum computing simulations based on neural networks, including attention-based neural networks, are disclosed. In one example embodiment, a quantum program written in a given programming language is submitted via an application programming interface (API) to an attention-based neural network, and an approximated result is generated via a neural network model, as if the quantum program were executed on a quantum backend (returning counts, distribution of probabilities, and the like). In one example embodiment, the attention-based neural network generates the output based on the given input (such as a quantum program and/or algorithm) in a similar manner to neural translation processes. Thus, the disclosed neural-based quantum simulator generates estimated results of a quantum program using inferencing and provides techniques for testing, evaluating, and debugging quantum programs without requiring the resources of a conventional quantum device or quantum simulator (referred to collectively as a "quantum calculator" herein). An exemplary neural-based quantum simulator reports general or detailed errors in response to failures in a quantum program 218-1.

One pertinent aspect of using attention-based neural networks is that they filter the most important parts of the input content for the outputs, obviating less relevant details of the inputs. Thus, the neural networks more efficiently learn the differences between input quantum programs and their relation with the resulting states, counts distribution, and the like. It is noted that users can specify, potentially, any number of qubits. The neural behavior of the system will try to calculate an output even if it is not trained using the submitted quantum program or any of its features.

In one example embodiment, a user can choose whether the neural network models process their code in an ideal mode (without noise and the like) or including real constraints from actual quantum computers (for example, accounting for the noise enclosing the physical qubits of the quantum devices; the neural network is trained to mimic the noise, which avoids requiring a user to enter the noise). The neural network model may be selected from a plurality of neural network models based on the programming language of the input quantum program, the configuration of the quantum device, the particular (real) quantum backend that is to be simulated (including, for example, the number of qubits), the simulation to perform, and the like. In one example embodiment, the neural network models are exposed via an API to enable integration with existing systems (including online systems (such as the IBM Quantum Platform available from International Business Machines Corporation, Armonk, NY, USA), local systems (such as programming integrated development environment (IDEs)), online resources, and the like). In one example embodiment, the neural-based quantum simulator is provided as a Service-as-a-Solution (SaaS).

In one or more embodiments, the attention-based neural networks are trained using quantum-related source code, the corresponding results, the configuration of the target quantum device or quantum simulator, and the like. (It is noted that the initial (random) weights of each model can be classical or can come from a target quantum backend (quantum noise).) Thus, a plurality of neural networks may be trained, where each neural network corresponds to one or more combinations of programming language, target quantum device or simulator configuration, and the like. The quantum code used for training can be retrieved from an existing database of quantum programs, may be randomly generated by a random generation process, may be obtained from interactions with users, and the like. (It is noted that the use of a random generation program process makes one or more embodiments, including the creation of the training dataset, more robust.) In one example embodiment, the results corresponding to the training quantum programs are generated using a quantum simulator or a real quantum computing device, depending on the training purposes. For example, one could use simulator-generated results if it is not desired to mimic errors from a real quantum device, or use quantum device-generated results if it is desired to mimic the behavior (and errors) from a real quantum computer. The code of the quantum program can include different constraints and specific quantum features from the target quantum computing device. Among the different quantum constraints that can be included as information encoded in the quantum programs used for training are the following:

- configuration of the quantum backend: the static information of the quantum device (this includes information such as the device name, the version of the device, the number of qubits available, the quantum gates available in that device, the measurement levels, the device's qubits connection layout, or any other current or future basic configuration);
- defaults of the backend: define the basic current configuration of the backend (this includes information fields like: the estimation of qubit frequencies, the measurement estimated frequencies, whether the device supports programming directly in pulses, any other future information related, and the like); and properties of the quantum backend: define the backend's performance gates, including which gates perform better, what are the coupling maps, which qubits are better to use (some fields included in this information are gates, general, qubits, and the like), and so on.

It is noted that each pair of quantum program and corresponding results depends on the number of runs (shots) or other execution parameters. Thus, the same quantum program may be paired pairing with different results depending on the execution parameters. These combinations between results and execution parameters (like shots) can be used to improve the neural network training process.

FIG. 1 is a high-level block diagram of an example neural-based quantum simulator system 210 for determining the results of a quantum program, in accordance with an example embodiment. In one example embodiment, a user 208 submits quantum code-related entities 216, such as a quantum program(s) 218-1, a quantum software development kit(s) (SDK) 218-2, a quantum library(ies) 218-3, and a quantum module(s) 218-4, via a neural networks (NNets) API 220 and/or a quantum computing platform API 240. (It is noted that a subset of the quantum code-related entities 216 may be submitted, such as only the quantum program 218-1). Regardless of the API utilized, the submitted quantum code-related entities 216 are input to the selected attention-based neural network(s) 228. (In general, a single neural network is selected; however, the quantum code-related entities 216 may be input to a plurality of neural networks, either sequentially or in parallel, to obtain results for different target quantum calculators, or to obtain a plurality of results for the same target quantum calculator.) In general, the attention-based neural networks 228 are trained on how the input text affects the output text (the computing result). They are capable of inferring differences in the results depending on the hardware constraints encoded in the quantum program used as input (for example, whether they include a name of a quantum backend, use of specific qubits in a backend, and the like). The selected attention-based neural network(s) 228 process the submitted quantum code-related entities 216 to infer the results of running the quantum program 218-1, as described more fully below in conjunction with FIG. 2.

The attention-based neural networks 228 are trained using a plurality of quantum programs, such as random quantum programs 224, user-provided quantum programs 232, and tailored quantum programs 236. The quantum programs 224, 232, 236 may be obtained from a database 244, from the user 208 via the quantum computing platform API 240, and the like.

To improve training, in one or more embodiments, every time a quantum program is introduced into the system 210, apart from inferring the result using the attention-based neural network(s) 228, the quantum program is also run by the selected quantum backend(s), such as quantum simulators 260 and quantum devices 264 of the quantum machines 256. (It is noted that the dispatcher 252 is a component of the queue of each quantum machine 256 and is used for dispatching programs from queue 248 to the appropriate quantum machine 256.) The results generated by the quantum machine 256 are compared with the results generated by the neural-based quantum simulator 210. The quantum program 218-1 and the corresponding result are also added to the database 244 (if it does not already exist in the database 244). Augmenting the database 244 leads to reinforcement of and improvement to the system 210. In one example embodiment, the database 244 also includes quantum programs that include errors (in syntax, in procedures used, and the like); in this case, the system 210 returns an error and does not return a distribution of probabilities and counts. In case the result from the inference is not correct, the system 210 or the user 208 can add the pair of quantum program 218-1 and the corresponding result (using a particular running configuration) to the training database 244 to improve the overall performance of the system 210.

In the non-limiting example of FIG. 1, the "User" block 208 represents the final users and all the software they can use to write and execute quantum programs. The upper block in the "Cloud" part of the system 210 (including quantum programs 224, 232, 236, neural networks (NNets) API 220, attention-based neural network(s) 228) are cloud and/or server deployed services, the storage needed to store models, programs, and the like, and the infrastructure generally needed to implement an online solution. The bottom part of "Cloud" block of the system 210 is implemented using similar hardware components to the upper block of the "Cloud," but is configured to provide a quantum computing platform (such as classical or quantum servers, cloud hardware, databases, connectivity solutions, and the like). Given the teachings herein, the skilled artisan can implement the elements depicted in FIG. 1.

Figure 2:
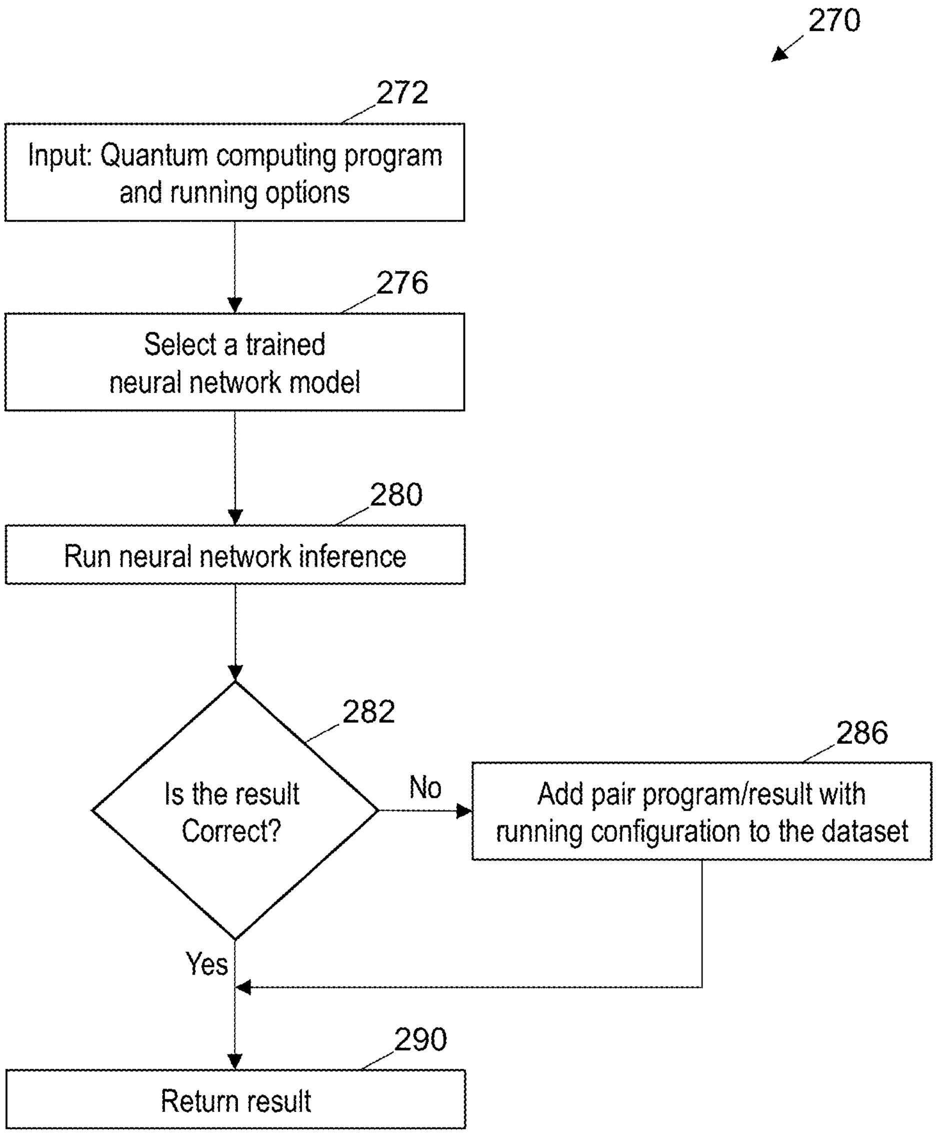
FIG. 2 a flowchart for an example method for determining the results of a quantum program, in accordance with an example embodiment.

FIG. 2 a flowchart for an example method 270 for determining the results of a quantum program 218-1, in accordance with an example embodiment. In one example embodiment, a user 208 submits quantum code-related entities 216 and running options, such as the configuration of the target quantum calculator to be run (operation 272). One or more of the trained neural network models are selected for inferencing (operation 276). As described above, the neural network may be selected based on the language of the quantum program 218-1, the configuration of the target quantum calculator, and the like. The selection may be rules-based, may be carried out by another neural network, may be carried out by the user 208, and the like. For example, a selection neural network, which functions as a recommendation engine, may be trained using historical combinations of neural network selections and the results (outputs) that were obtained. A given combination of quantum program, configuration of the target quantum calculator, and the like is then submitted to the selection neural network and the identification of an appropriate neural network for use by the system 210 is provided by the selection neural network based on the inputs.

Inferencing is performed using the selected neural network (operation 280). A check is performed to determine if the result of the inferencing is correct (decision block 282). If the result is correct (YES branch of decision block 282), the result is returned (operation 290). If the result is not correct (NO branch of decision block 282), in operation 286, the submitted quantum code-related entities 216, the corresponding result, and the running options are added to the database 244 (if not already present in the database 244) and the result is returned (operation 290). It is noted that the database 244 is not revised if the result is correct as the system 210 is assumed to be performing satisfactorily and further training/examples is/are not required. In one example embodiment, decision block 282 is excluded from the method 270 and operations 286 and 290 are performed serially or in parallel such that the database is continuously updated (for example, the checks of results can be done during training/test using an actual result but can be skipped during inference with a trained and tested model; also, the user could flag a result as right or wrong). Thus, the system 206 may be trained with successful and/or failed quantum programs 218-1.

FIGS. 3A-3F are examples of quantum programs 218-1 and the results generated by a given quantum calculator and the system 210 using the quantum program 218-1, in accordance with an example embodiment. The examples are related to potential results returned by a system 210 trained to simulate up to five qubits and using specific quantum programming languages. The examples show how the neural network model could perform for different simulations for which it has been trained (such as less than 5 qubits, 5 qubits, quantum programs with errors, and the like) and simulations for which it has not been trained (such as quantum programs using more than 5 qubits).

Given the discussion thus far, it will be appreciated that, in general terms, an exemplary method, according to an aspect of the invention, includes the operations of obtaining quantum code-related entities 216 (operation 272); selecting, using a hardware computing device, one or more of a set of one or more trained neural network models 228 for inferencing based on the quantum code-related entities 216 (operation 276); performing, using the hardware computing device, the inferencing using the submitted quantum code-related entities 216 and the selected one or more trained neural network models 228 (operation 280); and returning a result of the inferencing operation (operation 290).

In one aspect, an apparatus comprises a memory and at least one processor, coupled to the memory, and operative to perform operations comprising obtaining quantum code-related entities 216 (operation 272); selecting, using a hardware computing device, one or more of a set of one or more trained neural network models 228 for inferencing based on the quantum code-related entities 216 (operation 276); performing, using the hardware computing device, the inferencing using the submitted quantum code-related entities 216 and the selected one or more trained neural network models 228 (operation 280); and returning a result of the inferencing operation (operation 290).

In one aspect, a non-transitory computer readable medium comprises computer executable instructions which when executed by a computer cause the computer to perform the method of obtaining quantum code-related entities 216 (operation 272); selecting, using a hardware computing device, one or more of a set of one or more trained neural network models 228 for inferencing based on the quantum code-related entities 216 (operation 276); performing, using the hardware computing device, the inferencing using the submitted quantum code-related entities 216 and the selected one or more trained neural network models 228 (operation 280); and returning a result of the inferencing operation (operation 290). In one or more embodiments, the instructions configure the processor to implement/instantiate one or more of the software-based elements of FIG. 1.

In one example embodiment, one or more running options include a configuration of a target quantum calculator to be simulated and the selecting operation is based on the one or more running options.

Figure 4:
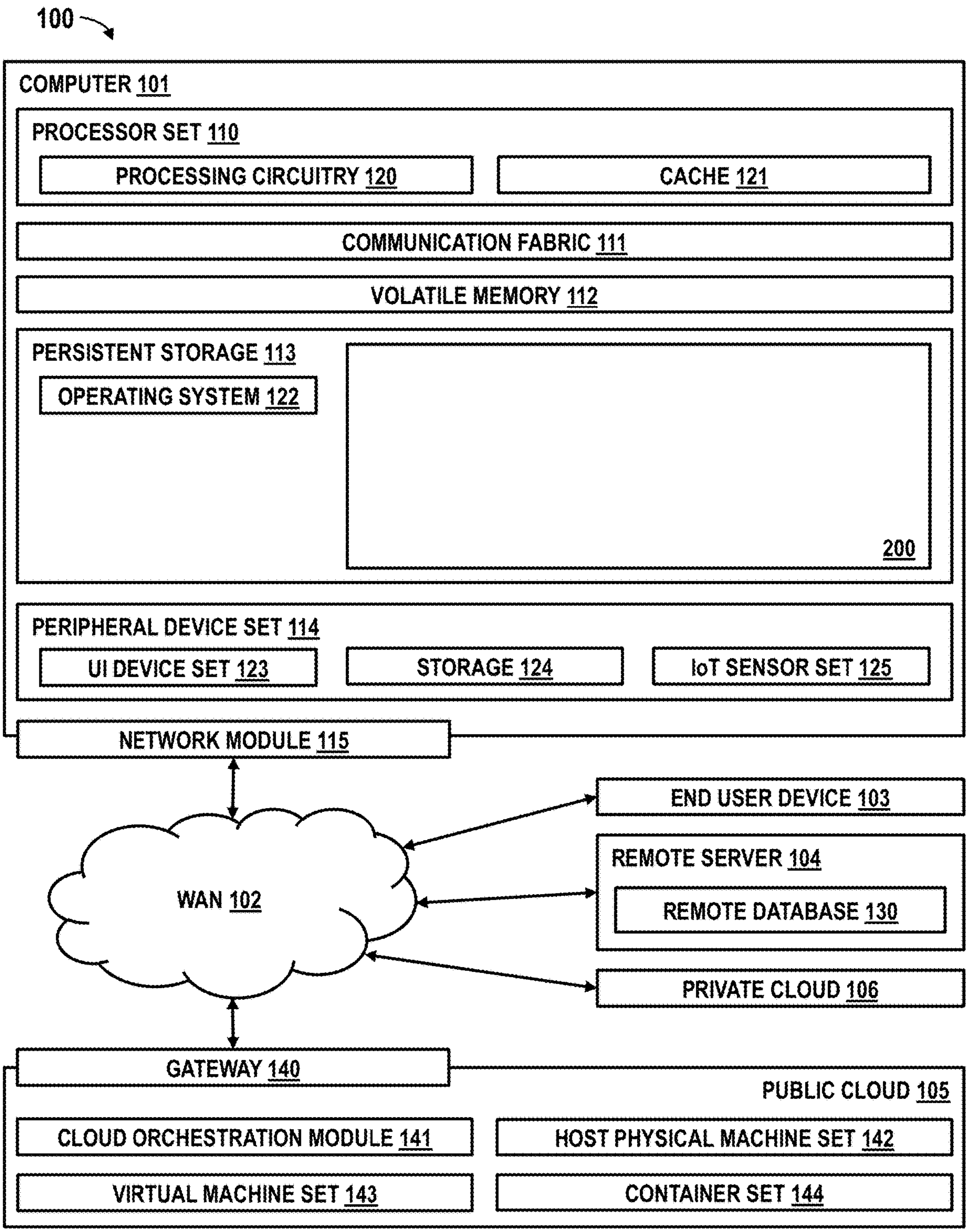
FIG. 4 depicts a computing environment according to an embodiment of the present invention.

In one example embodiment, the quantum code-related entity 216 includes a quantum program 218-1 and the quantum program 218-1 is debugged based on the results of the simulation of the quantum program 218-1. In one example embodiment, the debugged program is deployed. In one example embodiment, the deployed debugged program is executed. It will be appreciated that deploying the debugged program facilitates its execution. Referring to FIG. 4, discussed in greater detail below, the debugged program could be deployed, for example, by making it available in persistent storage 113 and/or or sending it into the cloud and/or to another device/server over WAN 102.

In one example embodiment, the inferencing operation is performed using a plurality of the trained neural network models and generates quantum simulation results for a plurality of different given target quantum calculators.

In one example embodiment, the inferencing operation accounts for defined constraints of a target quantum calculator.

In one example embodiment, the selecting operation is based on a programming language of a quantum program 218-1 of the quantum code-related entities 216 and a configuration of a target quantum calculator to be simulated by the inferencing.

In one example embodiment, the returned result is verified by running a quantum program 218-1 of the quantum code-related entity 216 on a target quantum machine 256 and comparing the result of the inferencing operation and a result generated by the target quantum machine 256.

In one example embodiment, a developing neural network model is trained to obtain a given one of the set of one or more trained neural network models using a training quantum program 218-1 of the quantum code-related entity 216, a given result corresponding to the training quantum program 218-1, and a configuration of a target quantum calculator.

In one example embodiment, the training quantum program 218-1 is randomly generated.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as quantum simulator 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by at least one processor of a computing system, via an application programming interface, quantum code-related entities, wherein the at least one processor is not a quantum processor, and wherein the quantum code-related entities comprise a quantum program written in a quantum programming language of a group of quantum programming language;

selecting, by the at least one processor, a trained attention-based neural network model from a set of trained attention-based neural network models for inferencing based on the quantum programming language of the quantum program and a configuration of a target quantum calculator to be simulated;

performing, by the at least one processor, without executing the quantum program on a quantum computing device nor a conventional quantum simulator, the inferencing using the quantum code-related entities and the selected trained attention-based neural network model; and returning, by the at least one processor, via the application programming interface, a result of the inferencing, the result comprising an approximated quantum simulation result of the quantum program as if executed on a quantum backend, the approximated quantum simulation result comprising counts or a distribution of probabilities, wherein each trained attention-based neural network model of the set corresponds to a respective combination of a corresponding quantum programming language of the group and a corresponding configuration of a corresponding target quantum calculator, and is trained using training quantum programs, results corresponding to the training quantum programs, and the corresponding configuration of the corresponding target quantum calculator.

2. The method of claim 1, wherein the configuration of the target quantum calculator specifies a number of qubits.

3. The method of claim 1, further comprising debugging, by the at least one processor, the quantum program based on the result.

4. The method of claim 3, further comprising deploying the debugged quantum program.

5. The method of claim 4, further comprising executing the deployed debugged quantum program.

6. The method of claim 1, further comprising:

performing, by the at least one processor, the inferencing using a plurality of the trained attention-based neural network models; and generating, by the at least one processor, quantum simulation results for a plurality of different given target quantum calculators.

7. The method of claim 1, wherein the inferencing accounts for defined constraints of the target quantum calculator.

8. The method of claim 1, further comprising:

verifying, by the at least one processor, the result by running the quantum program on a target quantum machine; and comparing, by the at least one processor, the result of the inferencing and a result generated by the target quantum machine.

9. The method of claim 1, further comprising training, by the at least one processor, a developing neural network model to select a given one of the set of trained attention-based neural network models.

10. The method of claim 1, further comprising randomly generating at least one of the training quantum programs.

11. A non-transitory computer readable medium comprising computer executable instructions which when executed by at least one processor that is not a quantum processor of a computing system cause the computing system to perform operations comprising:

receiving, via an application programming interface, quantum code-related entities, wherein the quantum code-related entities comprise a quantum program written in a quantum programming language of a group of quantum programming language;

selecting a trained attention-based neural network model from a set of trained attention-based neural network models for inferencing based on the quantum programming language of the quantum program and a configuration of a target quantum calculator to be simulated;

performing, without executing the quantum program on a quantum computing device nor a conventional quantum simulator, the inferencing using the quantum code-related entities and the selected trained attention-based neural network model; and returning, via the application programming interface, a result of the inferencing, the result comprising an approximated quantum simulation result of the quantum program as if executed on a quantum backend, the approximated quantum simulation result comprising counts or a distribution of probabilities, wherein each trained attention-based neural network model of the set corresponds to a respective combination of a corresponding quantum programming language of the group and a corresponding configuration of a corresponding target quantum calculator, and is trained using training quantum programs, results corresponding to the training quantum programs, and the corresponding configuration of the corresponding target quantum calculator.

12. The non-transitory computer readable medium of claim 11, wherein the configuration of the target quantum calculator specifies a number of qubits.

13. The non-transitory computer readable medium of claim 11, wherein the operations further comprise debugging the quantum program based on the result.

14. The non-transitory computer readable medium of claim 13, wherein the operations further comprise deploying the debugged quantum program.

15. A computing system comprising:

at least one memory; and at least one processor that is not a quantum processor, coupled to the at least one memory, and operative to perform operations comprising:

receiving, via an application programming interface, quantum code-related entities, wherein the quantum code-related entities comprise a quantum program written in a quantum programming language of a group of quantum programming language;

selecting a trained attention-based neural network model from a set of trained attention-based neural network models for inferencing based on the quantum programming language of the quantum program and a configuration of a target quantum calculator to be simulated;

performing, without executing the quantum program on a quantum computing device nor a conventional quantum simulator, the inferencing using the quantum code-related entities and the selected trained attention-based neural network model; and returning, via the application programming interface, a result of the inferencing, the result comprising an approximated quantum simulation result of the quantum program as if executed on a quantum backend, the approximated quantum simulation result comprising counts or a distribution of probabilities, wherein each trained attention-based neural network model of the set corresponds to a respective combination of a corresponding quantum programming language of the group and a corresponding configuration of a corresponding target quantum calculator, and is trained using training quantum programs, results corresponding to the training quantum programs, and the corresponding configuration of the corresponding target quantum calculator.

16. The computing system of claim 15, wherein the configuration of the target quantum calculator specifies a number of qubits.

17. The computing system of claim 15, wherein the operations further comprise:

debugging the quantum program based on the result;

deploying the debugged quantum program; and facilitating execution of the deployed debugged quantum program.

18. The computing system of claim 15, wherein the operations further comprise:

performing inferencing operation using a plurality of the trained attention-based neural network models; and generating quantum simulation results for a plurality of different given target quantum calculators.

19. The computing system of claim 15, wherein the operations further comprise:

verifying the result by running the quantum program on a target quantum machine; and comparing the result of the inferencing and a result generated by the target quantum machine.

20. The computing system of claim 15, wherein the operations further comprise:

training a developing neural network model to select a given one of the set of trained attention-based neural network models.

* * * * *